(12) United States Patent
Shin et al.

(10) Patent No.: US 10,536,009 B2
(45) Date of Patent: Jan. 14, 2020

(54) DUAL CELL PROTECTION IC AND BATTERY MODULE INCLUDING SAME

(71) Applicant: LG Chem, Ltd., Seoul (KR)

(72) Inventors: Hak Yong Shin, Chungcheongbuk-do (KR); Ji Uk Jang, Chungcheongbuk-do (KR)

(73) Assignee: LG Chem, Ltd., Seoul (KR)

( * ) Notice: Subject to any disclaimer, the term of this patent is extended or adjusted under 35 U.S.C. 154(b) by 137 days.

(21) Appl. No.: 15/810,868

(22) Filed: Nov. 13, 2017

(65) Prior Publication Data

US 2018/0152030 A1    May 31, 2018

(30) Foreign Application Priority Data

Nov. 29, 2016    (KR) .......................... 10-2016-0160333

(51) Int. Cl.
*H02J 7/00*    (2006.01)

(52) U.S. Cl.
CPC .................................. *H02J 7/0026* (2013.01)

(58) Field of Classification Search
USPC ........................................................ 320/118
See application file for complete search history.

(56) References Cited

U.S. PATENT DOCUMENTS

| | | | |
|---|---|---|---|
| 6,903,533 B1 * | 6/2005 | Geren | H02J 7/0031 |
| | | | 320/134 |
| 2013/0082661 A1 * | 4/2013 | Bohan, Jr. | H01M 10/4221 |
| | | | 320/134 |
| 2016/0336773 A1 * | 11/2016 | Kadirvel | H02J 7/0026 |

FOREIGN PATENT DOCUMENTS

| | | |
|---|---|---|
| JP | 2009-529850 A | 8/2009 |
| KR | 20100018056 A | 2/2010 |
| KR | 20130066462 A | 6/2013 |
| KR | 20160079628 A | 7/2016 |

* cited by examiner

*Primary Examiner* — Robert Grant
(74) *Attorney, Agent, or Firm* — Mintz Levin Cohn Ferris Glovsky and Popeo, P.C.; Steven M. Jensen

(57) ABSTRACT

A dual cell protection IC and a battery module have a FET as an external type that are configured to protect a plurality of battery cells with one IC when an abnormal state caused during charge/discharge occurs.

10 Claims, 4 Drawing Sheets

DUAL CELL PROTECTION IC AND BATTERY MODULE INCLUDING SAME

CROSS-REFERENCE TO RELATED APPLICATION

This application claims priority to Korean Patent Application No. 10-2016-0160333 filed on Nov. 29, 2016 the disclosure of which is incorporated herein by reference in its entirety.

TECHNICAL FIELD

The present disclosure relates to a dual cell protection IC and a battery module including the same and more particularly, to a dual cell protection IC and a battery module, which accommodate an abnormal state caused during charge/discharge by configuring a FET as an external type and configuring a battery module capable of protecting two battery cells with one IC.

RELATED ART

Typically, batteries such as a lithium ion battery have been used as power sources for various electronic apparatuses. Generally, a battery (pack) includes a plurality of assemblies that have a plurality of unit cells. In particular, each unit cell includes a positive electrode collector, a separator, an active material, an electrolyte, an aluminum thin film, and the like. When a short circuit occurs within the cells incorporated in the battery, a battery-attached electronic device consumes an abnormal amount of power, or heat is generated and during over-charge or over-current the temperature of the battery rapidly increases.

When the temperature of the battery increases beyond a specified temperature, a significant amount of gas is discharged by decomposition of the electrolyte or the active material incorporated in the battery cell. The internal pressure of the cell rapidly increases and may cause the cell to explode. Additionally, the electrochemical characteristic of the battery cell deteriorate which thereby reduces the service life of the battery pack. Accordingly, a circuit that protects the battery from a temperature rise is required and general batteries have a battery management system (BMS) which includes a protection IC. When an abnormal state such as over-discharge, over-charge, or over-current occurs the protection IC operates ON/OFF of a charging FET/discharging FET which is a power switching element and thereby protects the battery from the abnormal state.

Conventionally, the protection IC will be described in detail with reference to FIG. 1. FIG. 1 is an exemplary block diagram of a typical battery module. Referring to FIG. 1, two battery cells includes a first battery module and include respective protection ICs. When a charging FET and a discharging FET are included a general protection IC may be damaged by the heat generated from the FET when a high current flows during charge/discharge. Additionally, when the battery module includes two battery cells, two protection ICs are included having an identical function which have protection ICs configured based on the number of cells and there is a limit in decreasing the size of the battery module. Further, when the protection IC is manufactured, the protection IC is assembled with stored specifications and the specifications cannot be adjusted even when an error occurs in a trimming operation.

Further, a protection IC with specifications that are different for each electronic apparatus are manufactured when batteries with various specifications are manufactured. The protection IC may have a long lead time according to each specification, and excess stock may be created according to product demand. Accordingly, in order to improve the reliability and production efficiency of the battery pack, it is necessary to decrease the development lead time of the protection IC and to protect the protection IC from the heat generated from an FET during charge and/or discharge.

The above information disclosed in this section is merely for enhancement of understanding of the background of the disclosure and therefore it may contain information that does not form the prior art that is already known in this country to a person of ordinary skill in the art.

SUMMARY

The present disclosure provides a dual cell protection IC and a battery module having the same capable of decreasing the size of the battery module and having an improved reliability and production efficiency by protecting the protection IC from the heat generated from a FET during charge/discharge.

In an aspect of an exemplary embodiment of the present disclosure, a dual cell protection IC for protecting a plurality of battery cells may include a voltage applying terminal (VDD) configured to detect a voltage of a first battery cell among the plurality of battery cells, a voltage detecting terminal (VM) coupled between the plurality of battery cells and configured to detect the potential difference between the cells, a ground terminal (VSS), a first discharging terminal (DO1) configured to output an on/off signal for a discharge current of the first battery cell, a first charging terminal (CO1) configured to output an on/off signal for a charging current of the first battery cell, a first state detecting terminal (CS1) configured to detect an over-current of the first battery cell during charge/discharge, a second discharging terminal (DO2) configured to output an on/off signal for a discharge current of a second battery cell among the plurality of battery cells, a second charging terminal (CO2) configured to output an on/off signal for a charge current of the second battery cell and a second state detecting terminal (CS2) configured to detect an over-current of the second battery cell during charge/discharge, and a setting terminal (OTP) connected to an external communication unit and configured to receive a limiting condition on charge/discharge from the exterior.

In some exemplary embodiments, the voltage applying terminal (VDD) may be coupled to a positive electrode of the first battery cell and a driving power source for the dual cell portion IC may thereby be applied. In other exemplary embodiments, the ground terminal (VSS) may be coupled to a negative electrode of the second battery cell. In some exemplary embodiments, the dual cell protection IC may be configured to include a memory that may be configured to store a charge/discharge limiting condition received by the setting terminal (OTP) from the exterior. In another exemplary embodiment, an over-charge or over-discharge state may be determined by using the voltage detected at the voltage applying terminal (VDD) and the voltage detecting terminal (VM).

In another aspect an exemplary embodiment of the present disclosure, a battery module may include a first battery cell and a second battery cell which are coupled in series, a first FET unit may include a first charging FET and a first discharging FET unit configured to turn on/off current the first battery cell, a second FET unit may include a second charging FET and a second discharging FET unit configured to turn on/off current of the second battery cell and a dual cell protection IC configured to operate the first FET unit and the second FET unit based on the voltage of each of the first battery cell and the second battery cell. In some exemplary embodiments, a plurality of battery modules may be disposed to be formed into a battery pack.

In another aspect of an exemplary embodiment of the present disclosure, a method of driving a dual cell protection IC may include receiving electrical specifications of a battery module from the exterior, setting the electrical specifications received by the battery module as a condition for detecting an over-charge state and an over-discharge state, individually monitoring a voltage of each battery cell while performing charge/discharge and operating a FET of a corresponding battery cell when over-charge or over-discharge occurs in the voltage monitoring step.

In some exemplary embodiments, the setting the battery specification may include storing electrical specifications into a memory. In other exemplary embodiments, the operating a FET may include detecting an occurrence of over-current and operating a FET of the corresponding battery cell.

BRIEF DESCRIPTION OF THE DRAWINGS

Exemplary embodiments may be understood in more detail from the following description taken in conjunction with the accompanying drawings, in which.

DETAILED DESCRIPTION

Figure 1:
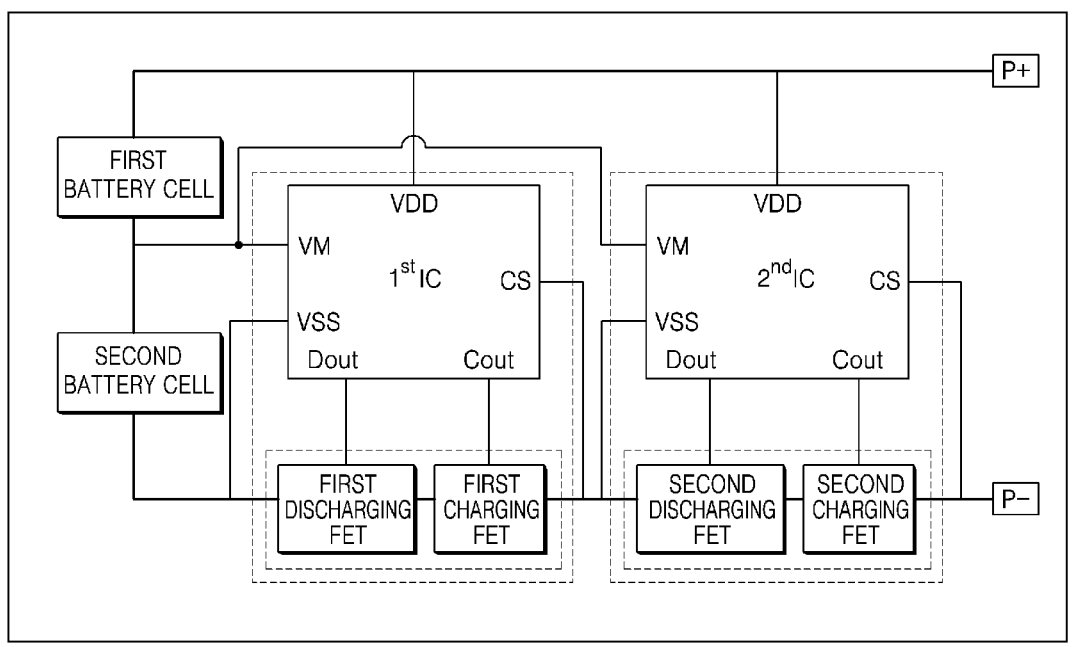
FIG. 1 is an exemplary block diagram of a typical battery module in accordance with a related art.

Hereinafter, embodiments of the present disclosure will be described with reference to the accompanying drawings. However, the description provided herein is for better understanding of the present disclosure, and the scope of the present disclosure is not limited thereto. In describing the exemplary embodiments, thicknesses of lines and dimension of components shown in the drawings may be expressed exaggeratedly for clarity and convenience of description. In addition, terms to be described below are those defined in consideration of functions in the present disclosure, which may vary depending on intention or custom of users or operators. Therefore, definition of these terms should be made based on the contents throughout this specification.

Throughout the specification, when a portion "is connected to" another portion, it not only includes a case in which the portions are directly connected but also a case in which the portions are electrically connected with another element therebetween. Throughout the specification, when a portion "includes" a component, it does not mean other components are not excluded as long as no opposing indication is present, but means other components may further be included. The terms "a step for" or "a step of" used throughout the specification of the present application does not mean "a step for the purpose of."

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

In addition, the terms including ordinal numbers such as first and second may be used to describe various components, but the components are not limited by the terns. The terms are used only for the purpose of discriminating one component from other components. For example, a first component may be named as a second component within the scope of the present disclosure, and the second component may be nabbed as the first component. The terms used in the present disclosure are used to describe only a specific embodiment, and are not used to limit the present disclosure. Singular representation includes plural representation unless otherwise noted clearly different in context.

General terns used as widely as possible at present are selected as the terns used in this disclosure while a function thereof in the disclosure is considered, but the terms may be changed according to intention of those skilled in the art, precedent, emergence of new technique, or the like. In addition, in a specific case, there may also be terms arbitrarily selected by the applicant, and in this case, the meaning of the terms may be described in detail in the description section of the disclosure. Thus, the terms used in this disclosure should be defined not on the basis of the simple names thereof but on the basis of the meaning thereof and contents thereof entirely over the present disclosure.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

A dual cell protection IC in accordance with an exemplary embodiment will now be described. A dual cell protection IC according with an exemplary embodiment may include a setting terminal (OTP) so that the specifications of a corresponding battery may be determined and a plurality (e.g., two) of protective terminals capable of protecting a plurality (e.g., two) of cells, and thus, may allow the battery to be more effectively produced and may be reduced in size when compared with the related arts.

Figure 2:
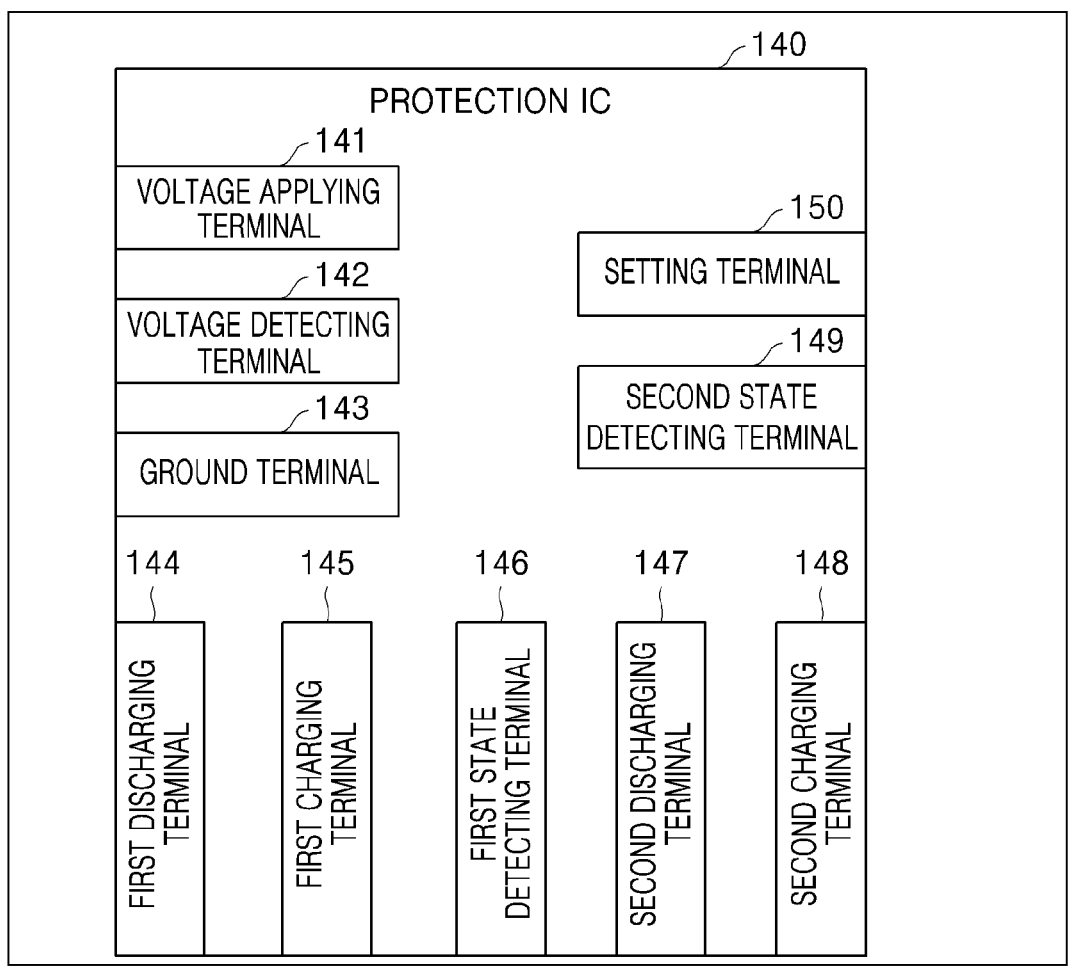
FIG. 2 is an exemplary block diagram of a dual cell protection IC in accordance with an exemplary embodiment of the present disclosure.

FIG. 2 is an exemplary block diagram of a dual cell protection IC in accordance with an exemplary embodiment. Referring to FIG. 2, a dual cell protection IC 140 in accordance with an exemplary embodiment may include a voltage applying terminal (VDD) 141 configured to detect the voltage of a first battery cell among a plurality of the (e.g., two) battery cells, a voltage detecting terminal (VM) 142 coupled between the two battery cells and configured to detect the potential difference between the cells, a ground terminal (VSS) 143, a first discharging terminal (DO1) 144 configured to output an on/off signal for a discharge current of the first battery cell, a first charging terminal (CO1) 145 configured to output an on/off signal for a charging current of the first battery cell, a first state detecting terminal (CS1) 146 configured to detect an over-current of the first battery cell during charge/discharge, a second discharging terminal (DO2) 147 configured to output an on/off signal for a discharge current of a second battery cell among the plurality of (e.g., two) battery cells, a second charging terminal (CO2) 148 configured to output an on/off signal for a charge current of the second battery cell, a second state detecting terminal (CS2) 149 configured to detect an over-current of the second battery cell during charge/discharge and a setting terminal (OTP) 150 coupled to an external communication unit and configured to receive a limiting condition on charge/discharge from the exterior.

In particular, the limiting condition on the charge/discharge means voltage and current values may be terminated and may restart charge/discharge currents. The over-charge voltage value may be determined in an exemplary embodiment, to approximately 4.2 V, and the over-discharge voltage value may be determine in an embodiment, to approximately 3 V but embodiments are not limited thereto.

Furthermore, each of the terminals will be described below in more detail. The voltage applying terminal (VDD) 141 may be coupled to the positive electrode of the first battery cell to receive a driving power source to enable each of the terminals in the dual cell protection IC 140 to be driven. In addition, the ground terminal (VSS) 143 may be coupled to the negative electrode of the second battery cell. The states of the two battery cells may be determined by using the voltages detected at the voltage applying terminal 141, the voltage detecting terminal 142, and the ground terminal 143. Accordingly, the over-charge and over-discharge states of each battery cell may also be determined by using the voltages detected at the voltage applying terminal 141, the voltage detecting terminal 142, and the ground terminal 143.

A method of driving the dual cell protection IC 140 when an over-current, an over-charge or an over-discharge occurs in the two battery cells will be described below in detail. When the first battery cell is in an over-charge state during charge, a signal is outputted through a control circuit (not shown) in the protection IC and a charging current for the first charging terminal 145 may be terminated (e.g., turned off). In addition, when the first battery cell is in an over-charge state during discharge, a signal may be outputted through a control circuit (not shown) in the protection IC and a discharging current for the first charging terminal 144 may be terminated (e.g., turned off). Further, during charge/discharge, the first state detecting terminal 146 may be configured to monitor whether an over current flows in the first battery cell and turns off the charging current through the first charging terminal 145 when an over-current flows during charge. When an over-current flows during discharge, the discharging current may be turned off through the first discharging terminal 144.

When the second battery cell is in an over-charge state during charge, a signal may be outputted through a control circuit (not shown) in the protection IC and a charging current for the second charging terminal 148 may be turned off. When the second battery cell is in an over-charge state during discharge, a signal is outputted through a control circuit (not shown) in the protection IC and a discharging current for the second discharging terminal 147 may be turned off. Additionally, during charge/discharge the second state detecting terminal 149 monitors whether an over-current flows in the second battery cell and may be configured to turn off the charging current through the second charging terminal 148 when an over-current flows during charge. When an over-current flows during discharge, the discharging current may be configured to turn off through the second discharging terminal 147.

Further, the dual cell protection IC 140 may be configured to include a memory. The memory may be configured to store the charge/discharge limiting condition received by the setting terminal (OTP) from the exterior. For example, the memory may be configured as a one-time programmable (OTP) ROM and may be configured to allow a value to be inputted once. Accordingly, after the battery is produced, the charge/discharge limiting condition according to user's requirement may be inputted by using the setting terminal (OTP).

In addition, the charge/discharge limiting condition may be determined through a separate setting circuit (not shown). The setting circuit (not shown) may be configured to apply the specification setting signal for charge/discharge, over-charge, and over-discharge to the voltage applying terminal 141 and may be configured to apply the specification setting signal for over-current to the first state detecting terminal 146 and the second state detecting terminal 149.

Next, a battery module in accordance with an exemplary embodiment will be described. A battery module in accordance with an exemplary embodiment may include a FET configured to turn on/off charge/discharge currents for a plurality of (e.g., each of two) battery cells and a dual cell protection IC configured to operate the FET. Accordingly, the plurality of battery cells may be protected from the heat generated in the FET during charge/discharge and the FET configuration may be designed separately from the dual cell protection IC.

Figure 3:
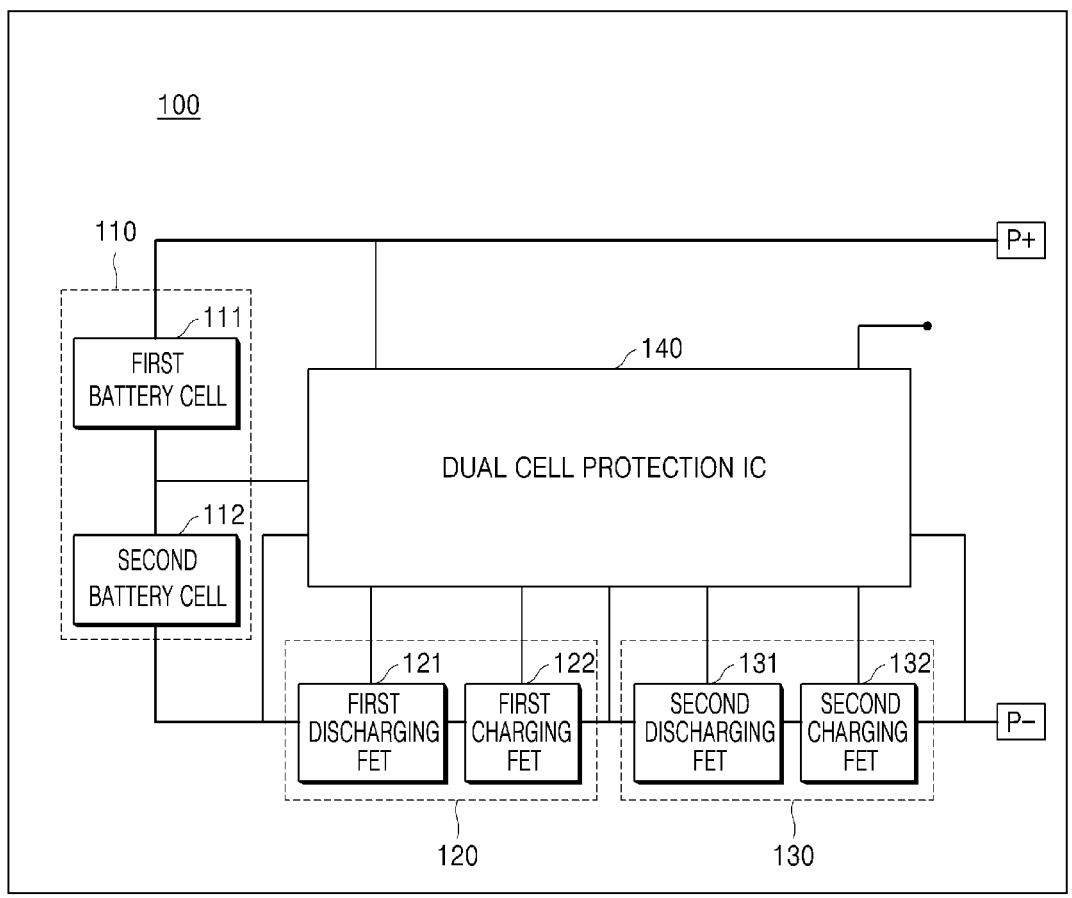
FIG. 3 is an exemplary block diagram of a battery module in accordance with an exemplary embodiment of the present disclosure.

FIG. 3 is an exemplary block diagram of a battery module in accordance with an exemplary embodiment of the present disclosure. Referring to FIG. 3, the battery module may include a battery 110 having a first battery cell 111 and a second battery cell 112 coupled in series, a first FET unit 120 having a first charging FET 122 and a first discharging FET unit 121 configured to turn on/off current of the first battery cell 111, a second FET unit 130 having a second charging FET 132 and a second discharging FET unit 131 configured to turn on/off current of the second battery cell 112 and a dual cell protection IC 140 configured to operate the first FET unit 120 and the second FET unit 130 based on the respective voltages of the first battery cell 111 and the second battery cell 112.

In particular, the configuration may protect the dual cell protection IC 140 from the FET heat generated by high-current flowing during a rapid charge. A method of driving the battery module 100 when an over-current, an over-charge, or an over-discharge may occur in the plurality of battery cells will be described below in detail. When the first battery cell 111 is in an over-charge state during charge, the dual cell protection IC 140 may be configured to output a charging current off signal for the first battery cell 111 and the first charging FET 122 may be turned off. Additionally, when the first battery cell 111 is in an over-discharge state during discharge, the dual cell protection IC 140 may be configured to output a discharging current off signal for the first battery cell 111 and the first discharging FET 121 may be turned off.

Further, when an over-current flows in the first battery cell 111 during charge, the dual cell protection IC 140 may be configured to output a charging current off signal for the first battery cell 111 and the first charging FET 122 may be turned off. When an over-current flows in the first battery cell 111 during discharge, the dual cell protection IC 140 may be configured to output a discharging current off signal for the first battery cell 111 and the first discharging FET 121 may be turned off. When the second battery cell 112 is in an over-charge state during charge, the dual cell protection IC 140 outputs may be configured to output a charging current off signal for the second battery cell 112, and the second charging FET 132 may be turned off.

Additionally, when the second battery cell 112 is in an over-discharge state during discharge, the dual cell protection IC 140 may be configured to output a discharging current off signal for the second battery cell 112 and the second discharging FET 131 may be turned off When an over-current flows in the second battery cell 112 during charge, the dual cell protection IC 140 may be configured to output a charging current off signal for the second battery cell 112 and the second charging FET 132 may be turned off. When an over-current flows in the second battery cell 112 during discharge, the dual cell protection IC 140 may be configured to output a discharging current off signal for the second battery cell 112 and the second discharging FET 131 may be turned off Subsequently, a method of driving a dual cell protection IC in accordance with an exemplary embodiment will be described. A method of driving a dual cell protection IC in accordance with an exemplary embodiment may include method in which electric specifications of a battery may be received from the exterior and set to the battery. Accordingly, the FETs may be operated in accordance with the electrical specifications set to each of battery cells.

Figure 4:
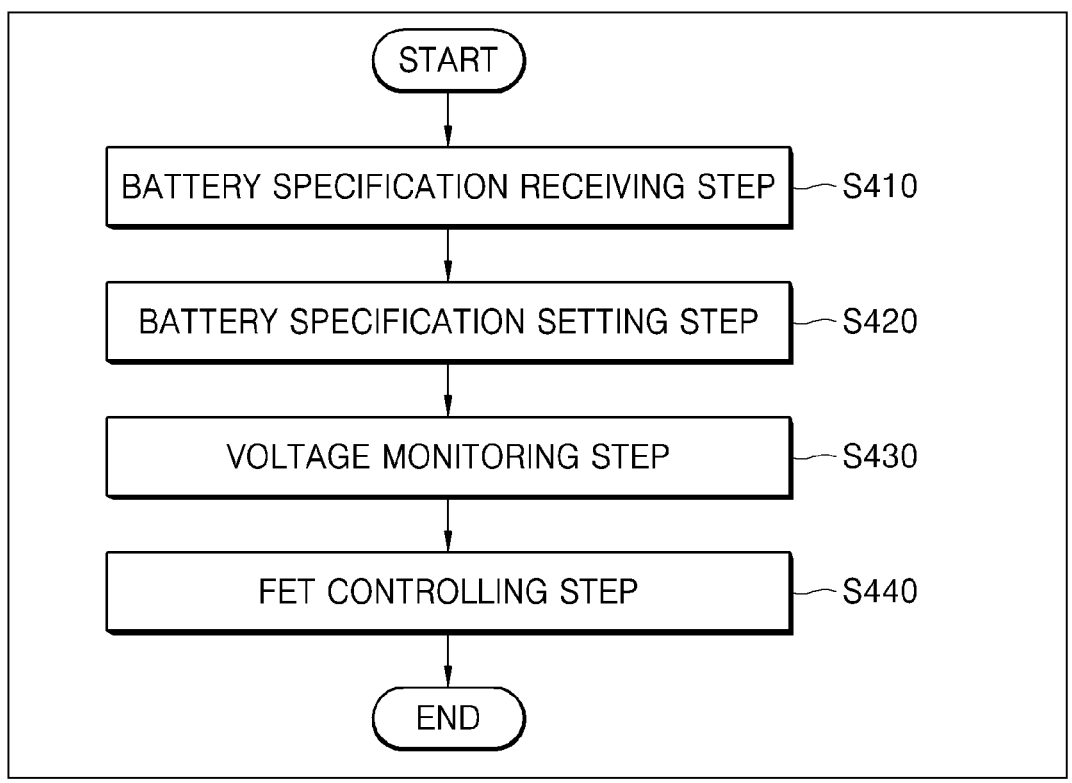
FIG. 4 is an exemplary flow chart of a method for driving a dual cell protection IC in accordance with an exemplary embodiment of the present disclosure.

FIG. 4 is an exemplary flowchart of a method of driving a dual cell protection IC in accordance with an exemplary embodiment. Referring to FIG. 4, a method of driving a dual cell protection IC in accordance with an exemplary embodiment may include receiving electrical specifications of a battery module from the exterior in the battery specification receiving step: S410 and determining the electrical specifications received in the battery specification receiving step S410 as a condition for detecting states of over-charge and over-discharge in the battery specification setting step: S420.

For example, a battery specification storing step for storing the electrical specification into a memory may be included. Additionally, the electrical specifications mean voltage and current values may be configured to terminate and restart the charge/discharge currents, when an over-charge or over-discharge state, or when an over-current flows. Further, in the battery specification setting step S420, an over-current detecting condition for detecting an over-current may be determined. Subsequently, when charge/discharge is performed, the voltages of each battery cell may be individually monitored in the voltage monitoring step S430. When an over-charge or over-discharge occurs in a battery cell, FETs of the battery cell may be operated in the FET controlling step S440. For example, an over-current controlling step, when an occurrence of an over-current is detected and an FET of the battery cell may be operated and may be further included in the FET controlling step S440.

A dual cell protection IC and a battery module including the same in accordance with exemplary embodiments may reduce the size of a battery pack including a battery module and may reduce the development lead time by designing an FET in an external type and configuring two protection ICs as one protecting IC. Thus, reliability and production efficiency of the battery pack may be improved during charge/discharge.

Although the technical concept of the present disclosure has been specifically described according to the above exemplary embodiments, it should be understood that the above embodiments are provided not to limit but to describe the technical concepts. Furthermore, those skilled in the art relating to technical field of the present disclosure may realize various embodiments within the techniques set forth in claims.

What is claimed is:

1. A dual cell protection integrated circuit (IC) for protecting a plurality of battery cells, comprising:
   a voltage applying terminal (VDD) configured to detect a voltage of a first battery cell among the plurality of battery cells;
   a voltage detecting terminal (VM) coupled between the plurality of battery cells and configured to detect a potential difference between the cells;
   a ground terminal (VSS);
   a first discharging terminal (DO1) configured to output an on/off signal to a first discharging transistor for turning on/off a discharge current of the first battery cell;
   a first charging terminal (CO1) configured to output an on/off signal to a first charging transistor for turning on and off a charging current of the first battery cell;
   a first state detecting terminal (CS1) configured to detect an over-current of the first battery cell during charge/discharge;
   a second discharging terminal (DO2) configured to output an on/off signal to a second discharging transistor for turning on/off a discharge current of a second battery cell among the plurality of battery cells;
   a second charging terminal (CO2) configured to output an on/off signal to a second charging transistor for turning on/off a charge current of the second battery cell;
   a second state detecting terminal (CS2) configured to detect an over-current of the second battery cell during charge/discharge; and
   a setting terminal (OTP) coupled to an external communication unit and configured to receive a limiting condition on charge/discharge from the exterior,
   wherein the first discharging terminal (DO1) and the second discharging terminal (DO2) are separately provided to independently control the first discharging transistor and the second discharging transistor, and
   wherein the first charging terminal (CO1)and the second charging terminal (CO2)are separately provided to independently control the first charging transistor and the second charging transistor.

2. The dual cell protection IC of claim 1, wherein the voltage applying terminal (VDD) is coupled to a positive electrode of the first battery cell, and a driving power source for the dual cell portion IC is thereby applied.

3. The dual cell protection IC of claim 1, wherein the ground terminal (VSS) is coupled to the negative electrode of the second battery cell.

4. The dual cell protection IC of claim 1, wherein the dual cell protection IC includes a memory configured to store a charge/discharge limiting condition received by the setting terminal (OTP) from the exterior.

5. The dual cell protection IC of claim 1, wherein an over-charge or over-discharge state is determined by using the voltage detected at the voltage applying terminal (VDD) and the voltage detecting terminal (VM).

6. A battery module comprising:
a first battery cell and a second battery cell connected in series;
a first FET unit having a first charging FET and a first discharging FET unit configured to turn on/off current of the first battery cell;
a second FET unit having a second charging FET and a second discharging FET unit configured to turn on/off current of the second battery cell; and
a dual cell protection IC configured to operate both the first FET unit and the second FET unit based on the voltage of each of the first battery cell and the second battery cell,
wherein the dual cell protection IC comprises:
 a first charging terminal (CO1) configured to output an on/off signal to the first charging FET;
 a first discharge terminal (DO1) configured to output an on/off signal to the first discharging FET;
 a second charging terminal (CO2) configured to output and on/off signal to the second charging FET; and
 a second discharge terminal (DO2)configured to output an on-off signal to the second discharging FET,
wherein the first charging terminal (CO1) and the second charging terminal (CO2) are separately provided to independently control the first charging FET and the second charging FET, respectively, and
wherein the first discharging terminal (DO1) and the second discharging terminal (DO2) are separately provided to independently control the first discharging FET and the second discharging FET, respectively.

7. The battery module of claim 6, wherein a plurality of battery modules are disposed to be formed into a battery pack.

8. A method of driving a dual cell protection IC comprising:
receiving electrical specifications of a battery module from an exterior;
setting the electrical specifications received by the battery module as a condition for detecting an over-charge state and an over-discharge state;
monitoring, individually a voltage of each battery cell while performing charge/discharge; and
controlling, by one dual cell protection IC, a first discharging FET and a first charging FET that correspond to a first battery cell and a second discharging FET and a second charging FET that correspond to a second battery cell when over-charge or over discharge occurs in the voltage monitoring step.

9. The method of driving a dual cell protection IC of claim 8, wherein the setting the specification includes storing electrical specifications into a memory.

10. The method of driving a dual cell protection IC of claim 8, wherein controlling a FET further includes detecting an occurrence of over-current and controlling the FET of the corresponding battery cell.

* * * * *